(12) United States Patent
Hohmann et al.

(10) Patent No.: US 9,255,678 B2  
(45) Date of Patent: Feb. 9, 2016

(54) LIGHTING APPLIANCE FOR VEHICLES

(71) Applicant: Hella KGaA Hueck & Co., Lippstadt (DE)

(72) Inventors: Carsten Hohmann, Warstein (DE); Martin Mügge, Geseke (DE)

(73) Assignee: Hella KGaA Hueck & Co. (DE)

( * ) Notice: Subject to any disclaimer, the term of this patent is extended or adjusted under 35 U.S.C. 154(b) by 212 days.

(21) Appl. No.: 14/160,190

(22) Filed: Jan. 21, 2014

(65) Prior Publication Data

US 2014/0286030 A1    Sep. 25, 2014

(30) Foreign Application Priority Data

Jan. 21, 2013  (DE) .................. 10 2013 100 561

(51) Int. Cl.  
*F21S 8/10* (2006.01)

(52) U.S. Cl.  
CPC ............... *F21S 48/00* (2013.01); *F21S 48/215* (2013.01); *F21S 48/2212* (2013.01); *F21S 48/2218* (2013.01); *F21S 48/2237* (2013.01); *F21S 48/2243* (2013.01); *F21S 48/2262* (2013.01); *F21S 48/2281* (2013.01); *F21S 48/232* (2013.01); *F21S 48/234* (2013.01); *F21S 48/25* (2013.01)

(58) Field of Classification Search  
CPC ..... F21S 48/00; F21S 48/2281; F21S 48/234; F21S 48/2243; F21S 48/2237  
USPC ........................................................... 362/511  
See application file for complete search history.

(56) References Cited

U.S. PATENT DOCUMENTS

| 6,955,459 B2 | 10/2005 | Mochizuki et al. |
| 2010/0165649 A1* | 7/2010 | Sun .................. F21S 48/1154 362/487 |

FOREIGN PATENT DOCUMENTS

| DE | 102008034376 A1 | 1/2010 |
| DE | 102008048765 A1 | 3/2010 |
| GB | 214492 A | 4/1924 |

* cited by examiner

*Primary Examiner* — David V Bruce  
(74) *Attorney, Agent, or Firm* — Husch Blackwell LLP (57) ABSTRACT

A lighting appliance for vehicles with a light unit includes a light source and a light guide assigned to the light source for the creation of a given light function, wherein the light guide is embodied as a rod-shaped light guide with a punctiform surface for the coupling-out of light or as a flat light guide with a line-shaped or a sheet-like surface for the coupling-out of light, wherein for the creation of the light function, a light surface magnifying unit is provided, which comprises a light source and a mask template unit for the generation of an illumination pattern from a light beam sent from a light source onto a projection screen.

16 Claims, 6 Drawing Sheets

LIGHTING APPLIANCE FOR VEHICLES

CROSS REFERENCE

This application claims priority to German Patent Application No. 10 2013 100 561.6, filed Jan. 21, 2013.

TECHNICAL FIELD OF THE INVENTION

The invention relates to a lighting appliance for vehicles with a light unit comprising a light source and a light guide assigned to the light source for the creation of a given light function, wherein the light guide is embodied as a rod-shaped light guide with a punctiform surface for the coupling-out of light or as a flat light guide with a line-shaped or a sheet-like surface for the coupling-out of light.

BACKGROUND OF THE INVENTION

From DE 10 2008 048 765 A1, a lighting appliance for vehicles is known, which comprises a light unit with a multitude of light sources as well as a flat light-guide assigned to them. The flat light guide has a line-shaped surface for the coupling-in of light and a line-shaped surface for the coupling-out of light, between which flat sides extend on which the coupled-in light is fully reflected in the direction of the line-shaped surface for the coupling-out of light. The light unit allows the creation of a relatively small light band, which can, for example, be used for the creation of a daytime running light function. If this light unit is to be used for the creation of a stop light- and direction indicator function, it would fail to meet the legal requirements relating to-the minimum surface size for the light function applicable in the United States of America. To create the light function, the lit area would have to be magnified, which in turn would require an additional light source resp. light guide. The styling requirements relating to lighting appliances for vehicles are high, however. An additional simple shining function surface to achieve the legally required surface size is not desirable.

Therefore, the problem of the present invention is the further development of a lighting appliance for vehicles with a relatively small illuminated surface of a signal function so that the legal requirements with regard to the minimum illuminated surface are always met and so that a simple method for a pleasing appearance of the lighting appliance and for the variation of the appearance is ensured.

SUMMARY OF THE INVENTION

To solve this problem, for the creation of said light function, a light surface magnifying unit is provided, which comprises a light source and a mask template unit for the generation of an illumination pattern from a light beam sent from a light source onto a projection screen, wherein the projection screen is embodied so that the light beam is deflected in the main radiation direction.

In a reflected-light projection variant of the invention, a masking surface extends in the main radiation direction of the light unit; in a transmitted-light projection variant of the invention it extends transverse to the main radiation direction of the light unit. In the transmitted-light projection variant of the invention the mask template unit can be arranged in front of the light source in the light radiation direction to project the illumination pattern created by the mask template unit onto a translucent or structured lens which is positioned in front of the mask template unit (transmitted-light projection).

The particular advantage of the invention is that by means of a light surface magnifying unit comprising a mask template unit according to the invention, a given illumination pattern for the creation of an additional illuminated surface is created in a simple manner. This light surface magnifying unit exclusively serves the magnification of the illuminated surface, so that by adding the surface for the coupling-out of light (illuminated surface) of a light unit creating the given light function and the illuminated surface of the light surface magnifying surface, a total illuminated surface is achieved which is larger than the legally required minimum illuminated surface for the light function.

The mask template unit allows that a specific illumination pattern is created depending on the desired design of the lighting appliance. By this means the illumination pattern can be selected depending on the shape of the lighting appliance and or customer-specific recognition features or it can be easily adapted for different vehicle model ranges or vehicle equipment variants.

According to a preferred embodiment of the invention, a projection screen of the light surface magnifying unit is arranged adjacent to the light guide of the light unit, so that the light surface of the light surface magnifying unit abuts directly on the light surface of the light unit. By this means, a uniform total light surface is created.

According to a further development of the invention, the projection surface is embodied dome-shaped, so that a relatively large illumination surface can be provided by using the depth of the housing of the lighting appliance.

According to a further development of the invention, the mask template unit has a projection body, which is arranged in the vicinity of the light source of the light surface magnifying unit. By this means, a masking created in the projection body can be projected onto the preferably diffuse projection surface in the manner of a slide projector.

According to a preferred embodiment of the invention, the projection body comprises a masking film having an illumination pattern. The masking film can, for example, be embodied as a printed film, so that different illumination patters with as many identical parts of the light surface magnifying unit as possible can be realized by simple means.

According to a further development of the invention, light deflecting means are assigned to the projection body, so that the light radiated from the light source of the light surface magnifying unit in the direction of the projection body is deflected.

According to a further development of the invention, a shield is arranged at the front of the projection body and/or the projection screen, so that the radiated light beam does not dazzle a vehicle driving ahead or oncoming vehicles.

According to a further development of the invention, the projection body is rotatably supported around an axis of rotation running parallel to the main radiation direction and can be rotated by means of an adjusting device. By this means, a moving illumination pattern can be created, thus increasing the warning or signal effect.

According to a further development of the invention, the projection body is rotatably driven by an angular velocity depending on the driving speed of the vehicle, so that the signal effect of the lighting appliance allows conclusions on the driving speed of the vehicle.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting appliance for vehicles can be used for signal functions in rear lamps or headlamps.

The lighting appliance comprises a pot-shaped housing 1, in which a light unit 2 for the creation of a given light function, as for example stop and or tail light or direction indicator function is arranged as well as a light surface magnifying unit 3.

The light unit 2 comprises a line-shaped light guide 4 comprising a line-shaped surface for the coupling-in of light and an opposing line-shaped surface for the coupling-out of light 5. The line-shaped surface for the coupling-out of light 5 is embodied as a curve resp. an arc. Opposing flat sides 6 extend between the line-shaped surfaces for the coupling-out of light 5 and the line-shaped surfaces for the coupling-in of light, on which the light emitted by the light sources, which are not represented, arranged in rows along the line-shaped surface for the coupling-in of light and coupled-in by the surface for the coupling-in of light is guided in the direction of the surface for the coupling-out of light 5. The flat light guide 4 is assigned such a number of light sources, that the given light function can be created by the light unit 2 alone. However, a light surface formed by the line-shaped surface for the coupling-out of light 5 of the light unit 2 is so small, that the minimum requirements on a light surface cannot be fulfilled for certain light functions, such as stop and direction indicator light (SAE approval in the USA: 50 cm$^2$ min.).

The light surface magnifying unit 3 is directly adjacent in the vertical direction to the light unit 2 being open toward the top in the vertical direction, a dome-shaped projection surface 7 having a concentric or partially concentric shape. A front edge 8 of the projection screen 7 is arranged immediately adjacent relative to the surface for the coupling-out of light 5 of the light unit 2. The light unit 2 emits a light beam L1 in the main radiation direction H to create the given light function. Furthermore, the light surface magnifying unit 3 comprises a central light source 9 and a mask template unit 10, by means of which a light beam L2 radiated from the light source 9 can be created according to a given illumination pattern. The mask template unit 10 has essentially a cylinder-shaped projection body.

For the creation of the illumination pattern, the mask template unit 10 resp. the projection body comprises an external transparent cylinder 11 and an internal transparent cylinder 12, each being arranged coaxially relative to the light source 9 resp. in the direction of the main radiation direction H. The so-called double cylinder 11, 12 is fastened on one side on a holding element 13 close to the top and on the other side on an opposing end support 14. The end support 14 is fastened to a shield 15 preventing undesirable radiation of the second light beam L2 in an upper vertical area.

Figure 1:
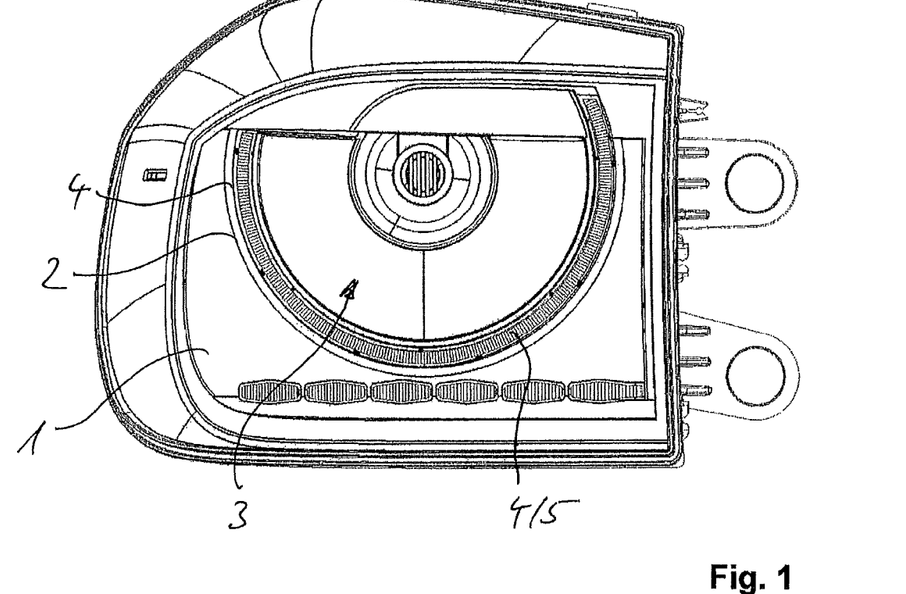
FIG. 1 A front view of a lighting appliance with a light unit for the creation of a given light function and a light surface magnifying unit for the creation of an additional light surface with an illumination pattern.
Figure 2:
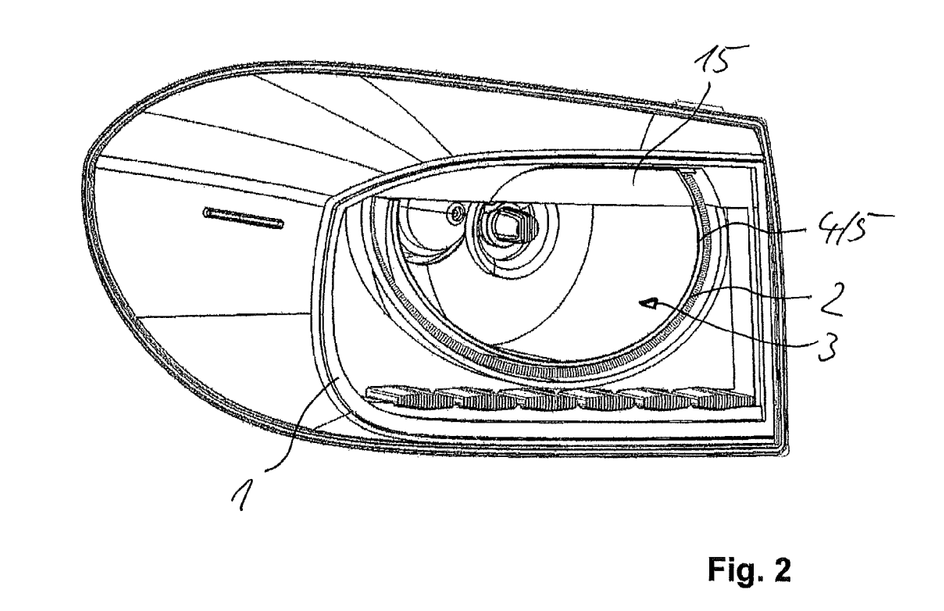
FIG. 2 A lateral front view of the lighting appliance according to FIG. 1.
Figure 3:
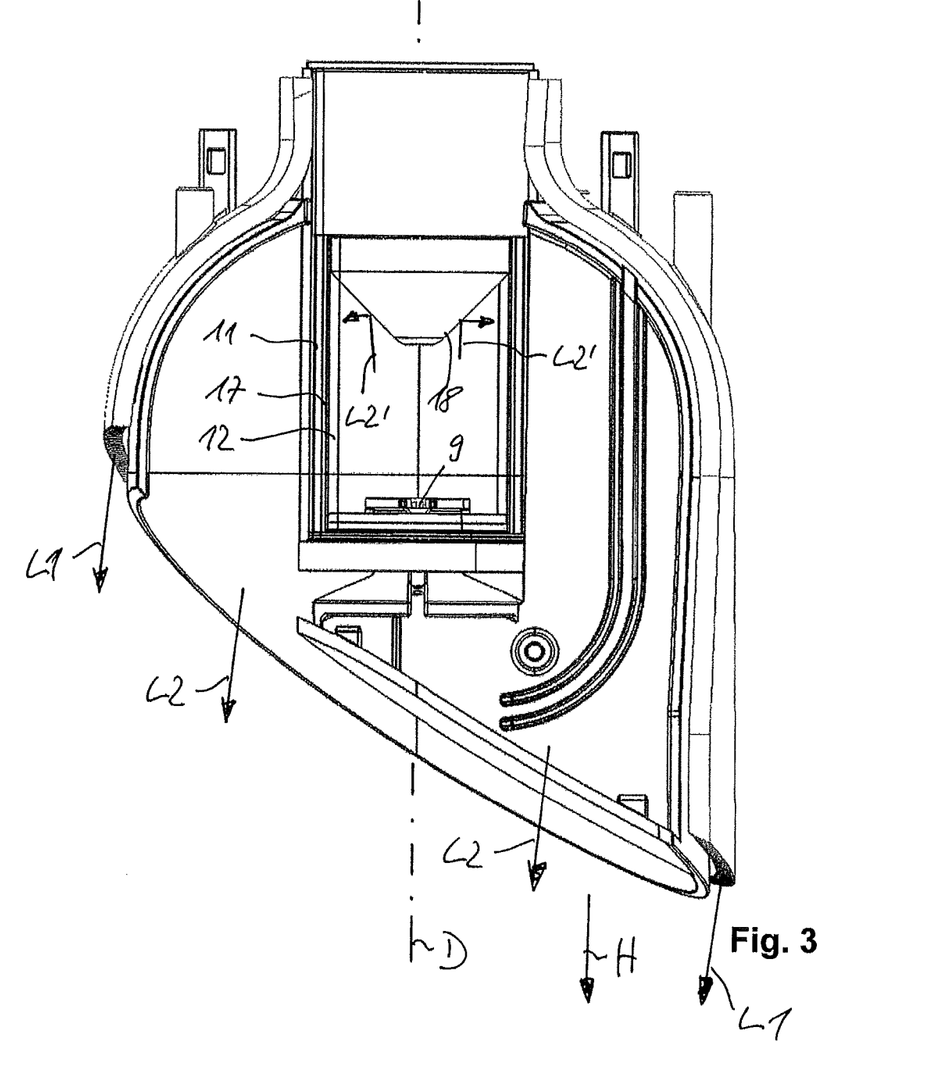
FIG. 3 A horizontal section of the lighting appliance according to FIG. 1.
Figure 4:
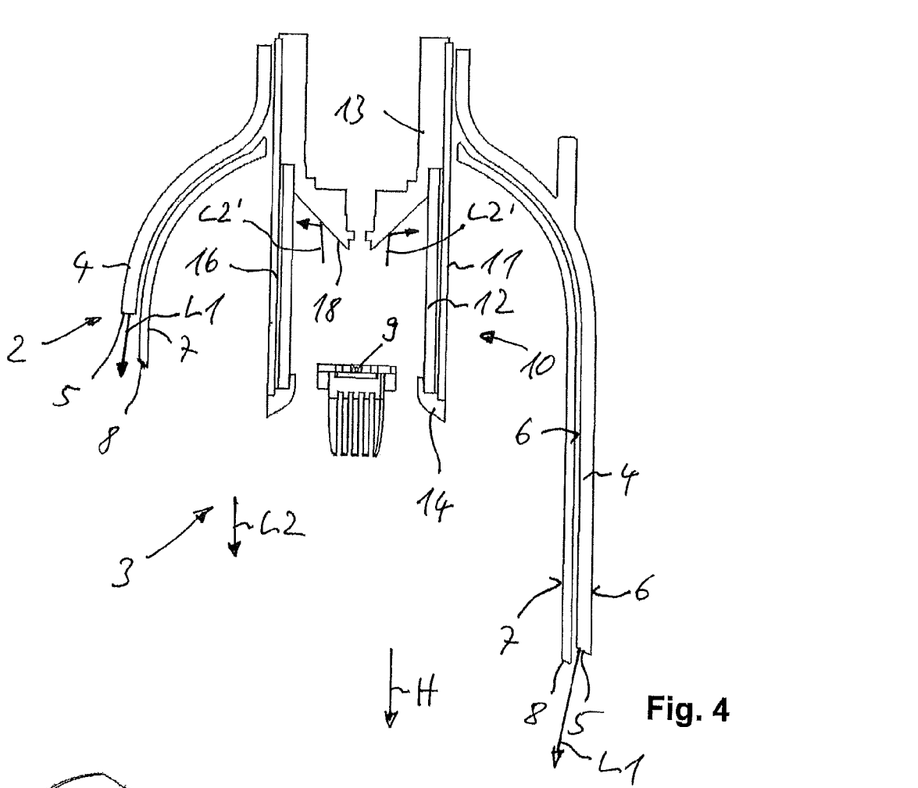
FIG. 4 A horizontal section of the lighting appliance according to FIG. 1 in the region of a light source of the light surface magnifying unit.
Figure 5:
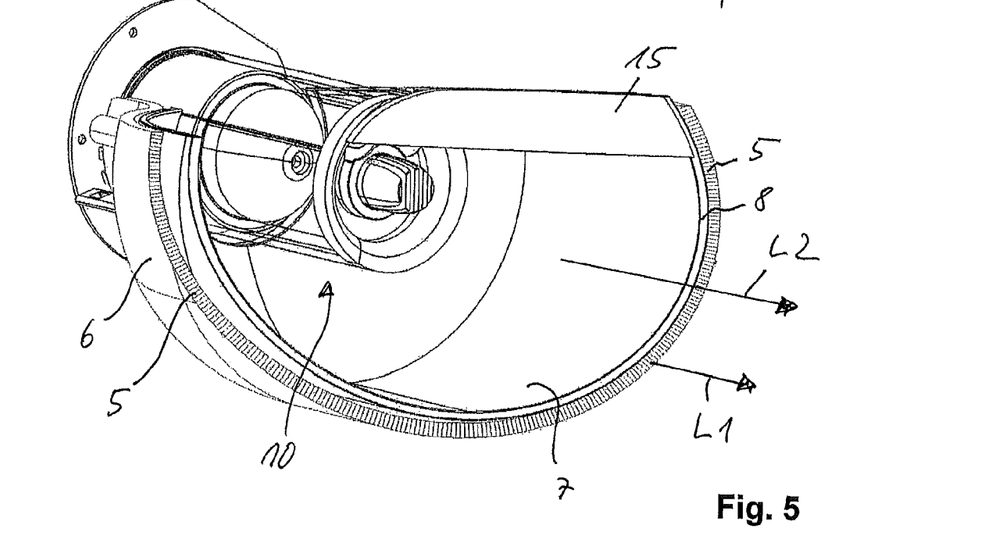
FIG. 5 A perspective lateral front view of the light surface magnifying unit on which the light unit abuts from the outside, FIG. 6 A perspective front view of the light surface magnifying unit with representation of a striped illumination pattern, FIG. 7 A perspective front view of the light surface magnifying unit with representation of a punctiform illumination pattern.
Figure 6:
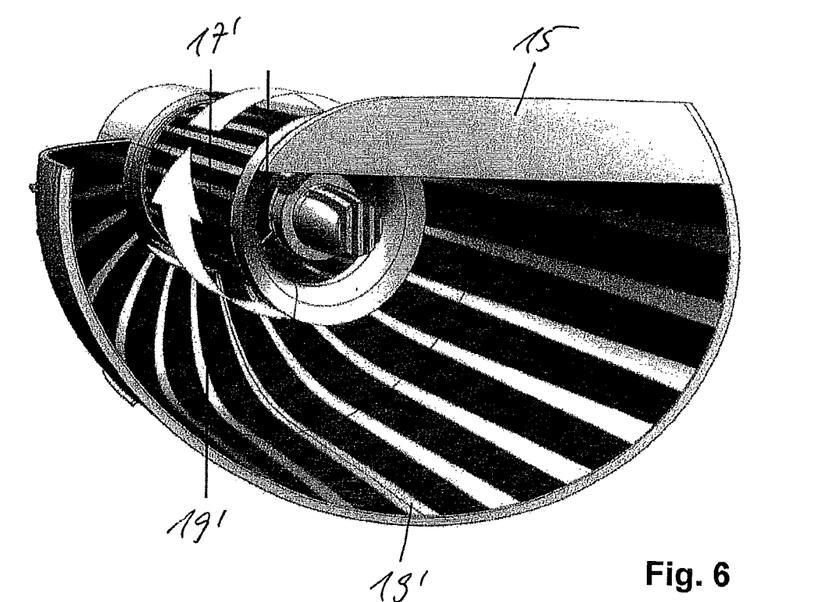
Figure 7:
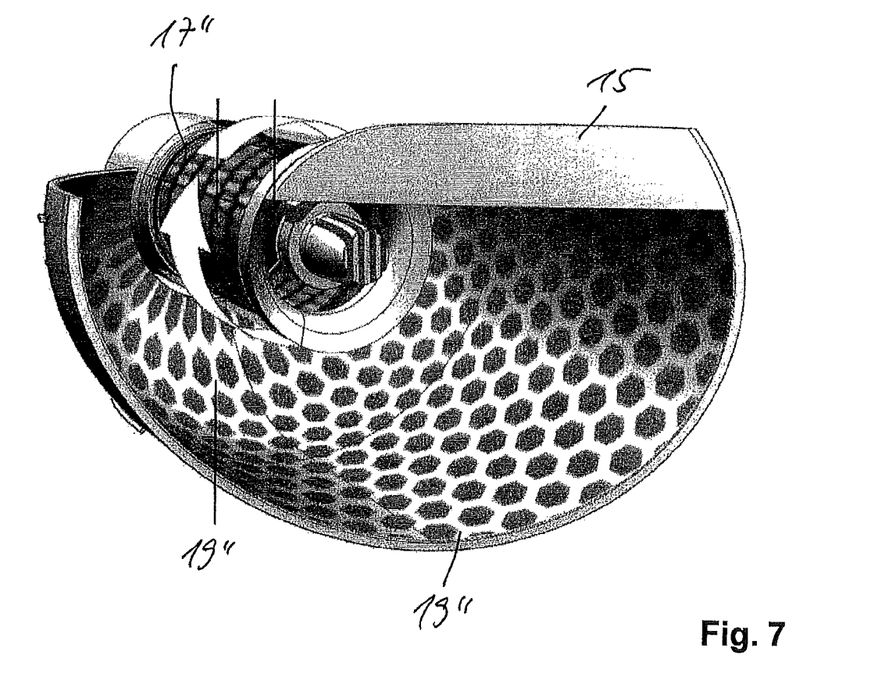

A masking film 17 comprising lightproof and light-transmissive sections is arranged in a gap 16 between the external cylinder 11 and the internal cylinder 12. The masking film 17 can, for example, be made from a transparent film comprising printed black, lightproof stripes, so that a masking film 17' according to FIG. 6 is embodied for the creation of a striped illumination pattern 19' being projected onto the projection screen 7. A punctiform pattern of a masking film 17" according to FIG. 7 can produce a punctiform illumination pattern 19". The lightproof section of the masking film 17, 17', 17" is produced by a black print. The light-transmissive section of the masking film 17, 17', 17" is formed by the transparent film. Alternatively, several printed films could also be provided as masking films 17.

Alternatively, at least one of the cylinders 11, 12 can also have a corresponding masking, so that an additional film is not required.

The illumination pattern can be applied to the cylinder 11, 12 for example by means of a coil silkscreen printing process.

According to an alternative embodiment of the invention the projection body can have a ball shape or a different shape instead of a cylinder or tube shape. It is essential, that the projection body is arranged at a distance to the light source 9 so that an illumination pattern 19', 19" is projected onto the projection screen 7.

The projection screen 7 is embodied as a reflective surface, which deflects the radiated light in the main radiation direction H. The projection screen 7 has such diffuse and/or opaque reflective surfaces, that the illumination pattern 19', 19" is visible on the projection screen 7 from the outside. The projection surface 7 does therefore not have the reflecting surfaces usually featured by dome-shaped reflectors of lighting appliances.

The holding element 13 has cone-shaped reflective sections 18, on which a partial light beam L2' of the light source 9 is deflected transverse to the main radiation direction H in direction of the projection body 10 resp. the cylinder 11, 12. The cone-shaped reflective sections 18 do therefore serve as light deflecting means, so that almost the entire light beam L2 emitted by the light source 9 can be used for the creation of the illumination pattern, on the projection screen 7. Therefore, the projection screen 7 forms a relatively large second light surface running vertical relative to the main radiation direction H. Together with the light surface 5 of the light unit 3 it forms a total light surface exceeding the minimum light surface.

According to an alternative embodiment of the invention which is not represented, the masking can also be embodied by optical elements or surface structures or laser engravings on at least one of the cylinders 11, 12.

Alternatively, several light sources, preferably LED light sources can be provided instead of a single light source 9, so that by simple means an angle deviation of the light resp. a lack of definition in the projected image is achieved which creates an additional depth effect or 3D-effect.

According to an alternative embodiment of the invention an LED-light source and a rod-shaped light guide can be provided instead of an LED light source 9, wherein the light guide receives the light of the LED light source and then radiates it in a circle resp. regularly in the direction of the cylinder 11, 12.

According to an alternative embodiment of the invention the projection body 10 together with the holding element 13 and the end support 14 can also be rotatably supported as a rotating mask template unit. The LED light source 9 is arranged fixed. The rotatable mask template unit is connected to an adjusting device, preferably an electric motor, which rotates the rotatable mask template unit by an axis of rotation D running parallel to the main radiation direction H at a constant or non-constant angular velocity. The angular velocity of this rotatable mask template unit can, for example, be dependent on the driving speed of the vehicle, wherein a low driving speed lets the mask template unit rotate at a low angular velocity and a high driving speed lets the mask template unit rotate at a high angular velocity. The mask template unit is preferably driven in steps, wherein the speed signal is provided by sensors on the crankshaft or on wheels of the vehicle.

According to an alternative embodiment of the invention which is not represented, the projection body 10 can also be ball-shaped instead of cylinder-shaped. Alternatively, it can also be polygonal, for example hexagonal or octagonal. The shape of the projection body 10 is adapted to the shape of the projection screen 7 resp. vice versa, so that an optimal illumination of the projection graphic resp. imaging of the projection body on the projection screen is ensured.

According to an alternative embodiment of the invention which is not represented, the light unit 2 can also have a rod-shaped light guide having only a punctiform surface for the coupling-out of light instead of a flat light guide. For example, several rod-shaped light guides can be arranged at a distance relative to one another, the signal function being formed by the sum of the punctiform surfaces for the coupling-out of light.

Figure 8:
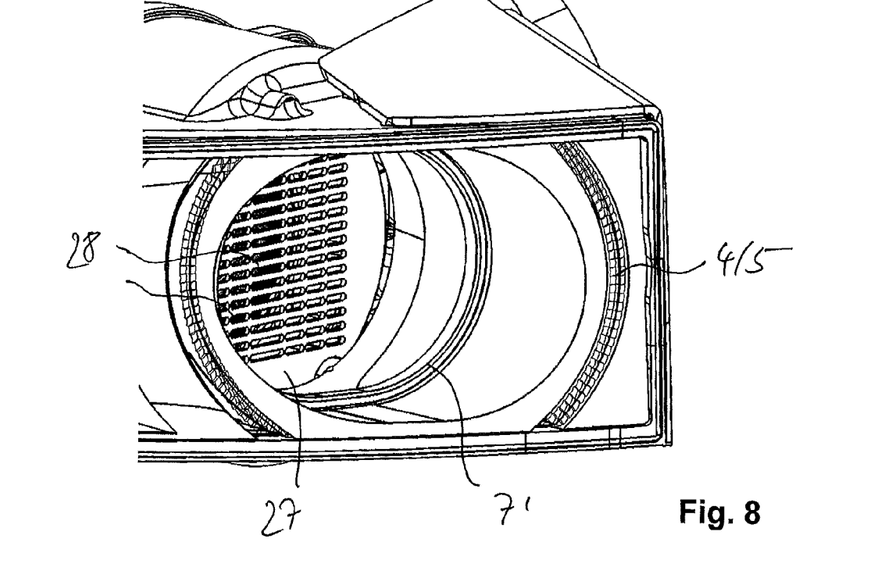
FIG. 8 A perspective lateral view of a lighting appliance with a light surface magnifying unit in which a transmitted-light projection of an illuminated pattern occurs.
Figure 9:
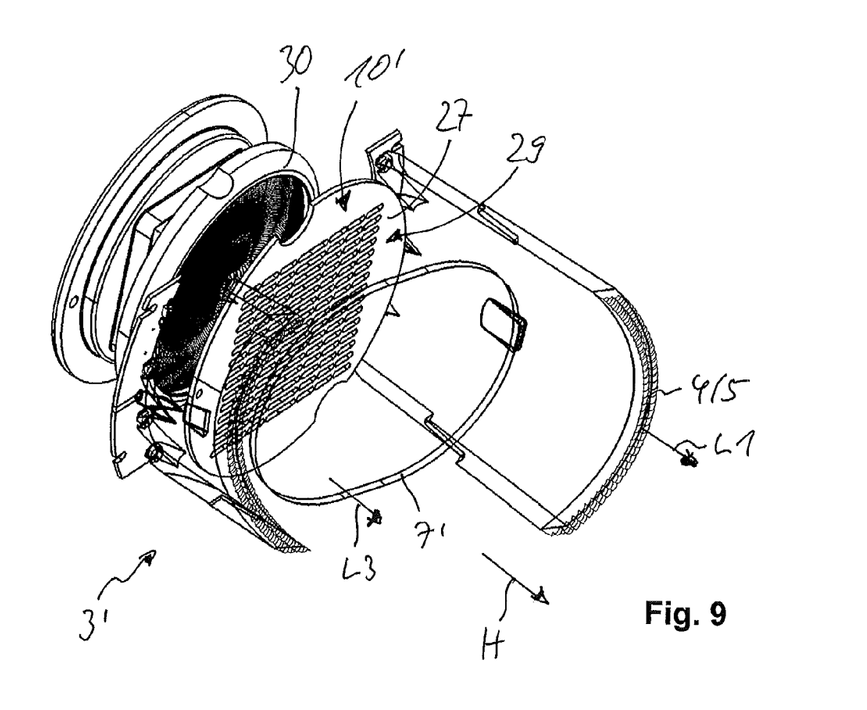
FIG. 9 An exploded perspective lateral view of the lighting appliance according to FIG. 8.
Figure 10:
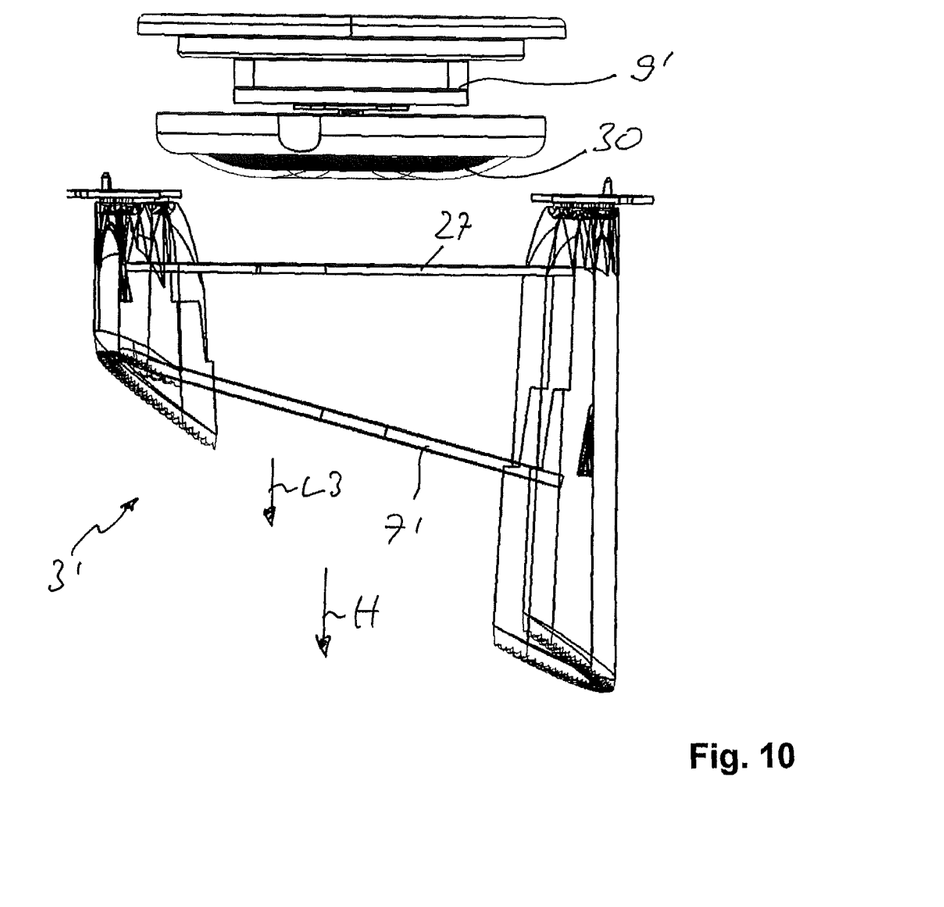
FIG. 10 A top plan exploded view of the lighting appliance according to FIG. 8.

According to a further embodiment of the invention according to the FIGS. 8 to 10, a light surface magnifying unit 3' is provided, in which a transmitted-light projection of an illumination pattern 29 takes place instead of a reflected-light projection according to the embodiment according to the FIGS. 1 to 7. The light surface magnifying unit 3' comprises a light source 9' and a mask template unit 10' arranged in a main radiation direction H in front of the light source 9. The mask template unit 10' comprises a masking plate 27 with a multitude of light-transmissive stripes 28. Therefore, the masking plate 27, like the masking film 17, has light-transmissive and light-proof sections. The masking plate 27 extends transverse to the main radiation direction H, while the masking film 17 runs essentially in the main radiation direction.

In the main radiation direction H in front of the masking plate 27, there is a projection screen 7', preferably inclined toward the masking plate 27, which can be embodied as a translucent or structured lens.

A Fresnel lens 30 is arranged in the main radiation direction H behind the masking plate 27, which achieves a parallelization of a light beam L3 emitted by the light source 9'. The Fresnel lens 30 can also be omitted according to an alternative embodiment.

Therefore, the light surface magnifying unit 3' allows an illumination pattern 29 on the projection screen 7', which achieves a light surface magnification for the light beam L1 radiated by the light unit 2.

Identical components resp. component functions of the embodiments have the same reference signs.

According to an alternative embodiment of the invention which is not represented, the light unit 2 can, instead of a flat light guide, comprise an arrangement of several reflectors or Fresnel lenses, wherein the signal function results from the sum of the reflectors or Fresnel lenses arranged next to one another.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SIGNS

1 Housing
2 Lighting unit
3 Light surface magnifying unit
4 Light guide
5 Surface for the coupling-out of light
6 Flat side
7 Projection screen
8 Edge
9 Light source
10 Mask template unit
11 External transparent cylinder
12 Internal transparent cylinder
13 Holding element
14 End support
15 Shield
16 Gap
17, 17', 17" Masking film
18 Reflective sections
19', 19" Illumination pattern
L1 Light beam
L2, L2' Light beam
H Main radiation direction
D Axis of rotation

The invention claimed is:

1. A lighting appliance for vehicles with a light unit comprising:

a light source and a light guide assigned to the light source for the creation of a given light function, wherein the light guide is a rod-shaped light guide with a punctiform surface for the coupling-out of light or as a flat light guide with a line-shaped or a sheet-like surface for the coupling-out of light, a light surface magnifying unit operable for the creation of said light function, which light surface magnifying unit comprises a light source and a mask template unit for the generation of an illumination pattern from a light beam sent from a light source onto a projection screen.

2. The lighting appliance according to claim 1, wherein the projection screen is arranged adjacent to the light guide of the light unit.

3. The lighting appliance according to claim 1, wherein the projection screen is dome-shaped, and that the line-shaped surface for the coupling-out of light of the light unit abuts on its front edge.

4. The lighting appliance according to claim 1, wherein the mask template unit comprises a projection body having an illumination pattern and being arranged in the vicinity of the light source of the light surface magnifying unit.

5. The lighting appliance according to claim 4, wherein the projection body is embodied in a cylindrical or tubular manner.

6. The lighting appliance according to claim 4, wherein the projection body comprises light-proof and light-transmissive sections as masking to create the illumination pattern.

7. The lighting appliance according to claim 4, wherein the projection body comprises a masking film having a masking.

8. The lighting appliance according to claim 4, wherein the projection body comprises two light-transmissive cylinders between which the masking film is arranged.

9. The lighting appliance according to claim 4, further comprising light deflecting means for the deflection of the light radiated from the light source in the direction of the projection body are assigned to the projection body.

10. The lighting appliance according to claim 4, wherein a shield is arranged on a front side of the projection body and/or the projection screen.

11. The lighting appliance according to claim 4, wherein the projection body is rotatably supported around an axis of rotation running parallel to the main radiation direction and can be rotated by means of an adjusting device.

12. The lighting appliance according to claim 11, wherein the projection body is rotatable by a constant velocity or by a velocity depending on the driving speed of the vehicle by means of the adjusting device.

13. The lighting appliance according to claim 4, wherein the shape of the projection screen is adapted to the shape of the projection body or vice versa.

14. The lighting appliance according to claim 1, wherein the light surface magnifying unit comprises an arrangement of reflectors or Fresnel lenses.

15. The lighting appliance according to claim 1, wherein the light surface magnifying unit comprises a light source and a mask template unit placed in the main radiation direction in front of the light source for the creation of an illumination pattern on a front projection screen by means of the light beam radiated by the light source, wherein the projection screen is embodied as a translucent or structured lens.

16. A lighting appliance according to claim 1, wherein the projection screen is embodied so that the light beam is deflected in the main radiation direction.

* * * * *